United States Patent [19]
Pherigo

[11] Patent Number: 5,469,934
[45] Date of Patent: Nov. 28, 1995

[54] FULLY-ADJUSTABLE TREE STAND

[76] Inventor: Calvin L. Pherigo, 712 E. 10th St., N. Newton, Iowa 50208-2204

[21] Appl. No.: 315,871

[22] Filed: Sep. 29, 1994

[51] Int. Cl.⁶ .................................................. A01M 31/02
[52] U.S. Cl. ........................................... 182/187; 108/152
[58] Field of Search .................................... 182/187, 188, 182/136; 108/152

[56] References Cited

U.S. PATENT DOCUMENTS

| 4,782,918 | 11/1988 | Brunner et al. | 182/187 |
| 4,936,416 | 6/1990 | Garon | 182/187 |
| 5,143,177 | 9/1992 | Smith | 182/187 |

*Primary Examiner*—Alvin C. Chin-Shue

[57] ABSTRACT

A new and improved fully-adjustable tree stand with a rectangular bracket having two vertically extending support bars. Four horizontally extending legs are secured to a back portion of the rectangular bracket. A metal securement clasp is secured to the side portion of each of the two support bars. A large lower platform has a support bracket secured to its lower surface. The support bracket has two end portions extending outwardly therefrom. The two end portions are coupled to a lower portion of the two vertically extending support bars of the rectangular bracket. A small upper platform has a support bracket secured to its lower surface. The support bracket has two end portions extending outwardly therefrom. The two end portions are coupled to an upper portion of the two vertically extending support bars of the rectangular bracket. A chain with two end portions serves to wrap around the tree with the two end portions secured to the metal securement clasps secured to the side portion of each of the two support bars of the rectangular bracket.

1 Claim, 4 Drawing Sheets

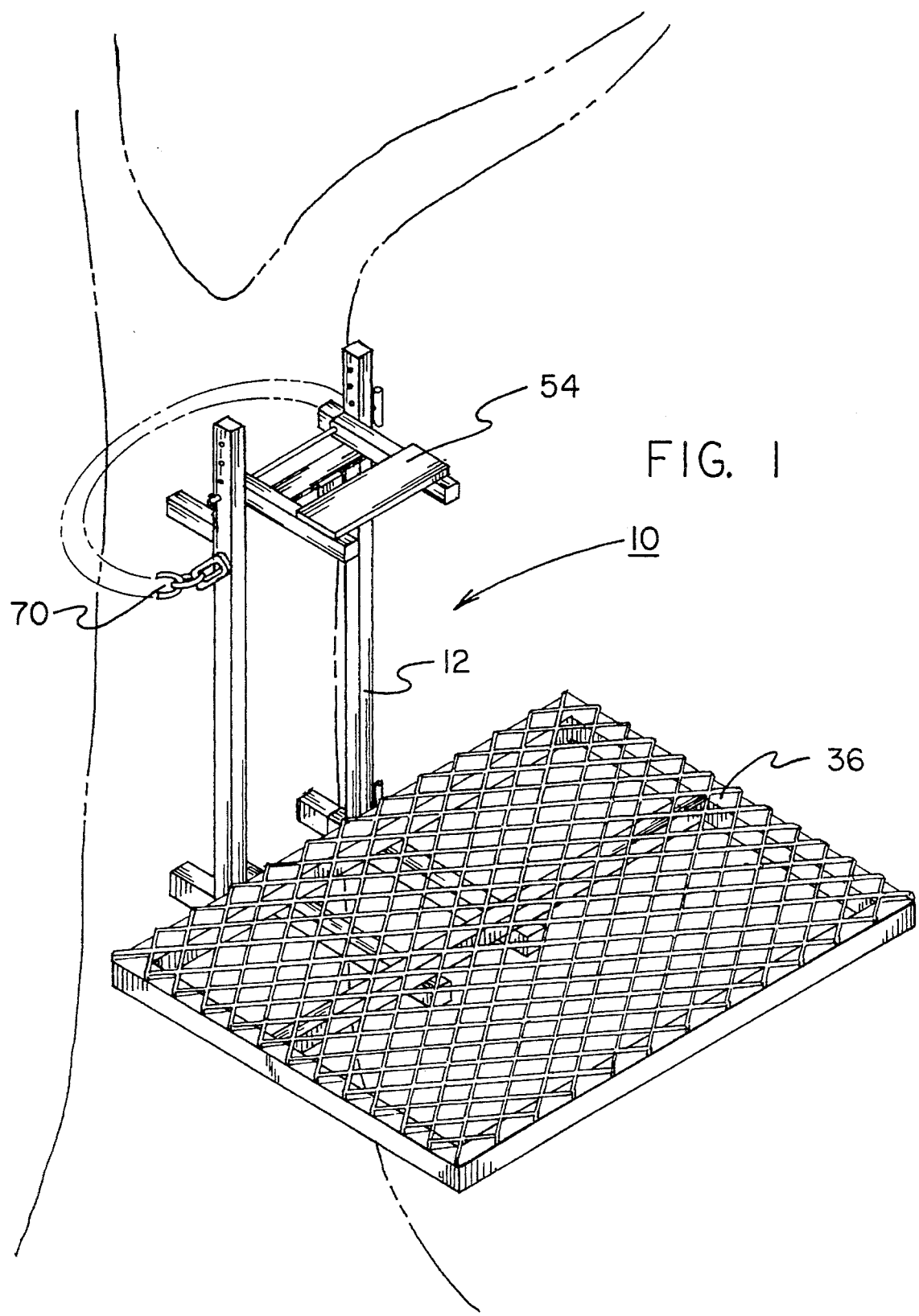

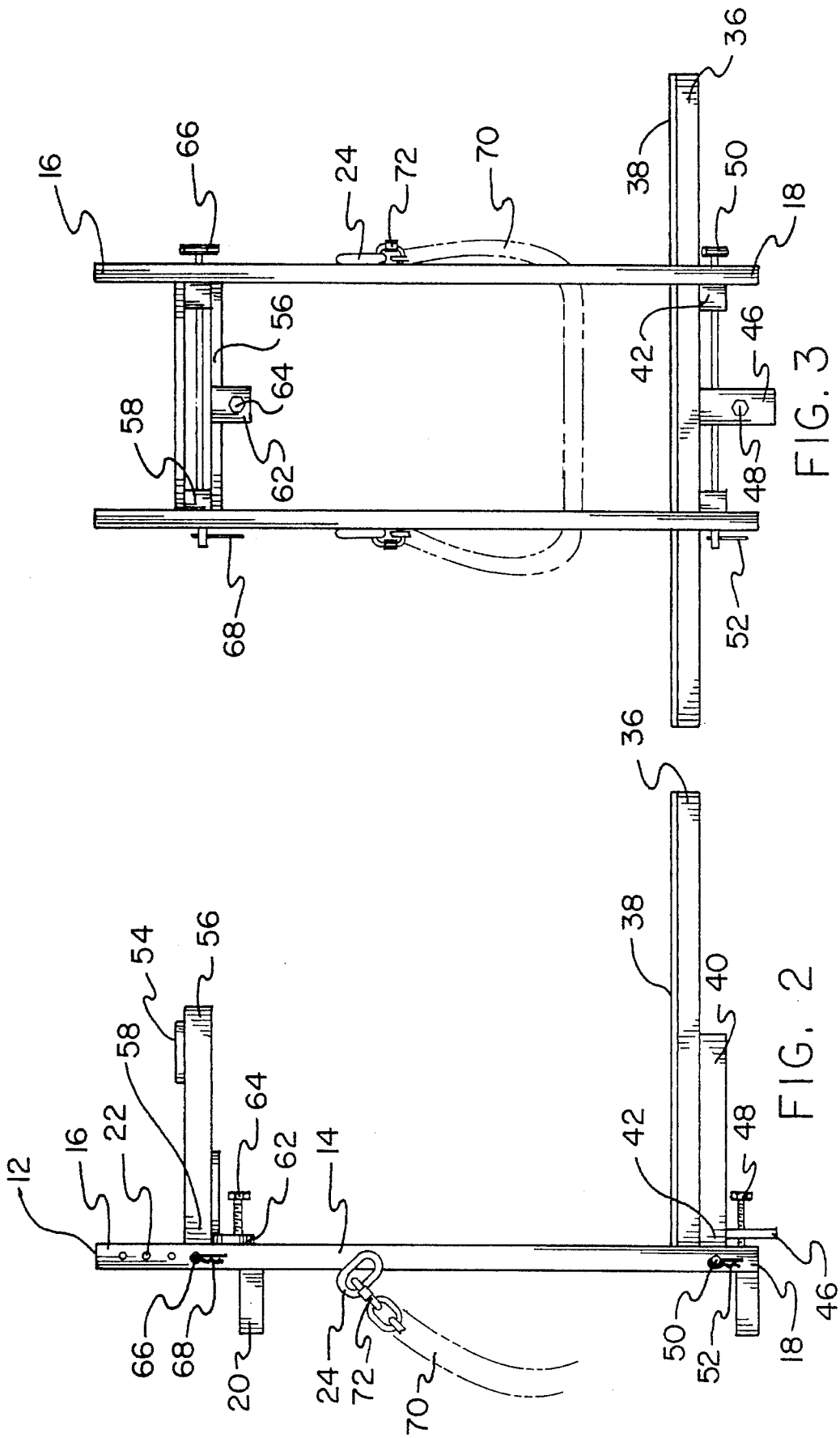

FULLY-ADJUSTABLE TREE STAND

BACKGROUND OF THE INVENTION

1. Field of the Invention

The present invention relates to a fully-adjustable tree stand and more particularly pertains to adjustably attaching to the trunk of a tree to support a hunter with a fully-adjustable tree stand.

2. Description of the Prior Art

The use of hunter platforms is known in the prior art. More specifically, hunter platforms heretofore devised and utilized for the purpose of providing a perch for hunters are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,997,063 to Bradley discloses a collapsible and adjustable tree stand. U.S. Pat. No. 5,090,506 to Womack et al. discloses an adjustable hunter's tree stand.

U.S. Pat. No. Des. 270,474 to Haines et al. discloses the ornamental design of a tree stand for hunters.

U.S. Pat. No. 5,234,077 to Sheriff discloses a hunting tree stand having a dual frame.

U.S. Pat. No. 5,078,232 to Hancosky discloses a tree stand.

While these devices fulfill their respective, particular objective and requirements, the aforementioned patents do not describe a fully-adjustable tree stand for adjustably attaching to the trunk of a tree to support a hunter.

In this respect, the fully-adjustable tree stand according to the present invention substantially departs from the conventional concepts and designs of the prior art, and in doing so provides an apparatus primarily developed for the purpose of adjustably attaching to the trunk of a tree to support a hunter.

Therefore, it can be appreciated that there exists a continuing need for new and improved fully-adjustable tree stand which can be used for adjustably attaching to the trunk of a tree to support a hunter. In this regard, the present invention substantially fulfills this need.

SUMMARY OF THE INVENTION

In the view of the foregoing disadvantages inherent in the known types of hunter platforms now present in the prior art, the present invention provides an improved fully-adjustable tree stand. As such, the general purpose of the present invention, which will be described subsequently in greater detail, is to provide a new and improved fully-adjustable tree stand and method which has all the advantages of the prior art and none of the disadvantages.

To attain this, the present invention essentially comprises a rectangular bracket having two vertically extending support bars. Each of the two support bars has a first end and a second end. Four horizontally extending legs are secured to a back portion of the rectangular bracket downward of each first end and to a back portion of each second end. Each first end has a plurality of apertures formed through a side portion thereof. The plurality of apertures of each first end align with the other. A metal securement clasp is secured to the side portion of each of the two support bars downward of the plurality of apertures thereof. An upper horizontal support bar is secured to the two vertically extending support bars downward of the plurality of apertures. An upwardly vertical extension is secured to a midpoint of the upper horizontal support bar. Each second end has an aperture formed through a side portion thereof. A lower horizontal support bar is secured to each second end of the two vertically extending support bars downward of the aperture. The lower horizontal support bar has a downwardly vertical extension secured to a midpoint thereof. The device contains a large lower platform having an upper surface and a lower surface. The upper surface has mesh surface theresecured. A support bracket is secured to the lower surface. The support bracket has two end portions extending outwardly therefrom. The two end portions have an aperture formed therethrough. The support bracket has a lower plate secured to a lower surface thereof. The lower plate has an adjustment means theresecured. The aperture formed through the two end portions correspond with the aperture formed in each second end of the rectangular bracket. A metal rod with locking pin couples the large lower platform to the rectangular bracket through the corresponding apertures thereof. The adjustment means corresponds with the downwardly vertical extension. The adjustment means serves to compensate for the angle at which trees lean. The device contains a small upper platform having an upper surface and a lower surface. A support bracket is secured to the lower portion. The support bracket has two end portions extending outwardly therefrom. The end portions have an aperture formed therethrough. The support bracket has a lower plate secured to a lower surface thereof. The lower plate has an adjustment means theresecured. The aperture formed through the two end portions corresponds with two of the aligning plurality of apertures formed in each first end of the rectangular bracket. A metal rod with locking pin adjustably couples the small upper platform to the rectangular bracket through the corresponding apertures thereof. The adjustment means corresponds with the upwardly vertical extension. The device contains a chain having two end portions. The chain serves to wrap around the tree with the two end portions secured to the metal securement clasps secured to the side portion of each of the two support bars of the rectangular bracket.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fully-adjustable tree stand which has all the advantages of the prior art hunter platforms and none of the disadvantages.

It is another object of the present invention to provide a new and improved fully-adjustable tree stand which may be easily and efficiently manufactured and marketed.

It is a further object of the present invention to provide a new and improved fully-adjustable tree stand which is of durable and reliable construction.

An even further object of the present invention is to provide a new and improved fully-adjustable tree stand which is susceptible of a low cost of manufacture with regard to both materials and labor, and which accordingly is then susceptible of low prices of sale to the consuming public, thereby making such a fully-adjustable tree stand economically available to the buying public.

Still yet another object of the present invention is to provide a new and improved fully-adjustable tree stand which provides in the apparatuses and methods of the prior art some of the advantages thereof, while simultaneously overcoming some of the disadvantages normally associated therewith.

Even still another object of the present invention is to provide a new and improved fully-adjustable tree stand for adjustably attaching to the trunk of a tree to support a hunter.

Lastly, it is an object of the present invention to provide a new and improved fully-adjustable tree stand with a rectangular bracket having two vertically extending support bars. Four horizontally extending legs are secured to a back portion of the rectangular bracket. A metal securement clasp is secured to the side portion of each of the two support bars. A large lower platform has a support bracket secured to its lower surface. The support bracket has two end portions extending outwardly therefrom. The two end portions are coupled to a lower portion of the two vertically extending support bars of the rectangular bracket. A small upper platform has a support bracket secured to its lower surface. The support bracket has two end portions extending outwardly therefrom. The two end portions are coupled to an upper portion of the two vertically extending support bars of the rectangular bracket. A chain with two end portions serves to wrap around the tree with the two end portions secured to the metal securement clasps secured to the side portion of each of the two support bars of the rectangular bracket.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the fully-adjustable tree stand constructed in accordance with the principles of the present invention.

FIG. 2 is a rear view of the preferred embodiment of the present invention.

FIG. 3 is a side view of the preferred embodiment of the present invention.

The same reference numerals refer to the same parts through the various Figures.

DESCRIPTION OF THE PREFERRED EMBODIMENT

Figure 4:
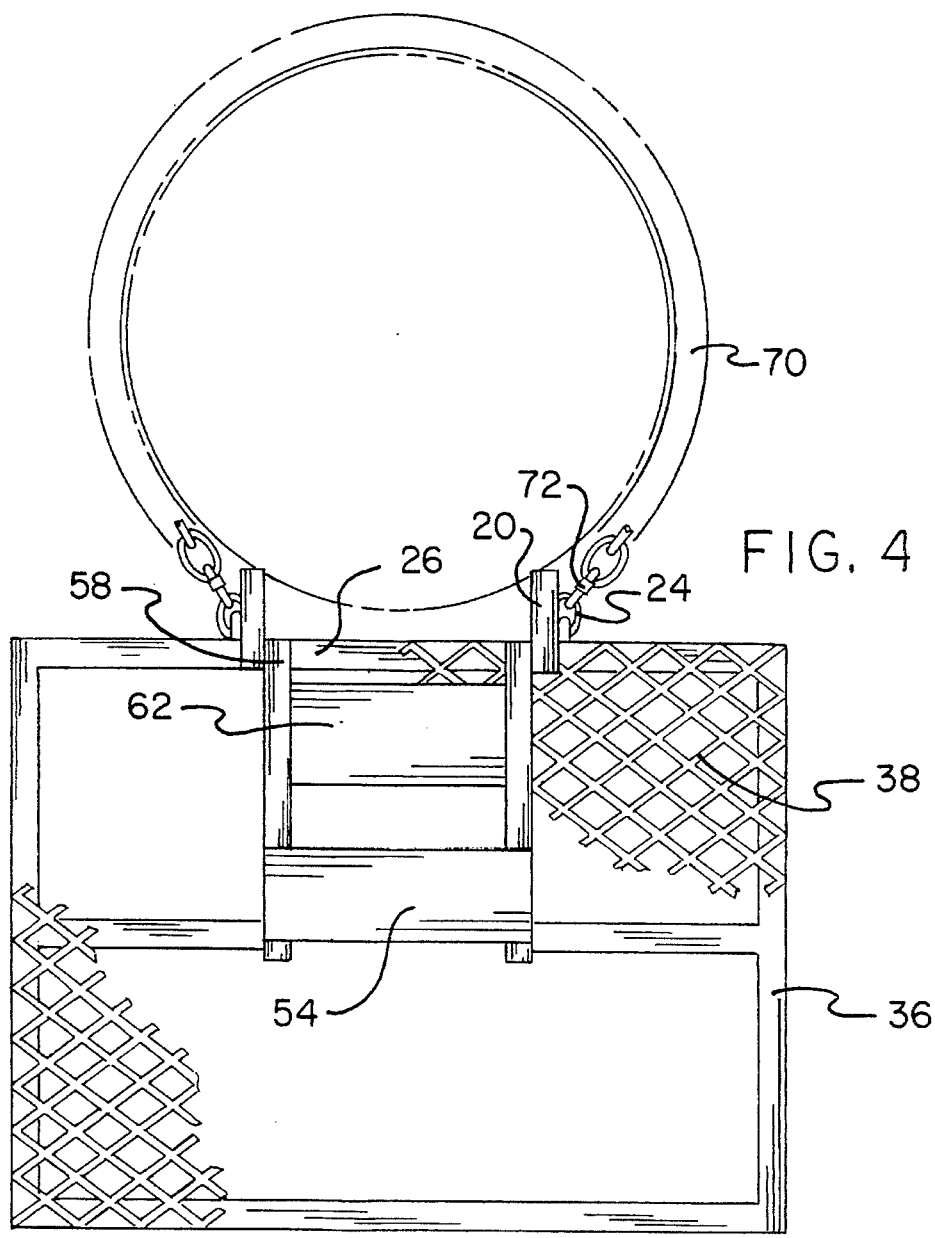
FIG. 4 is a plan view of the preferred embodiment of the present invention.
Figure 5:
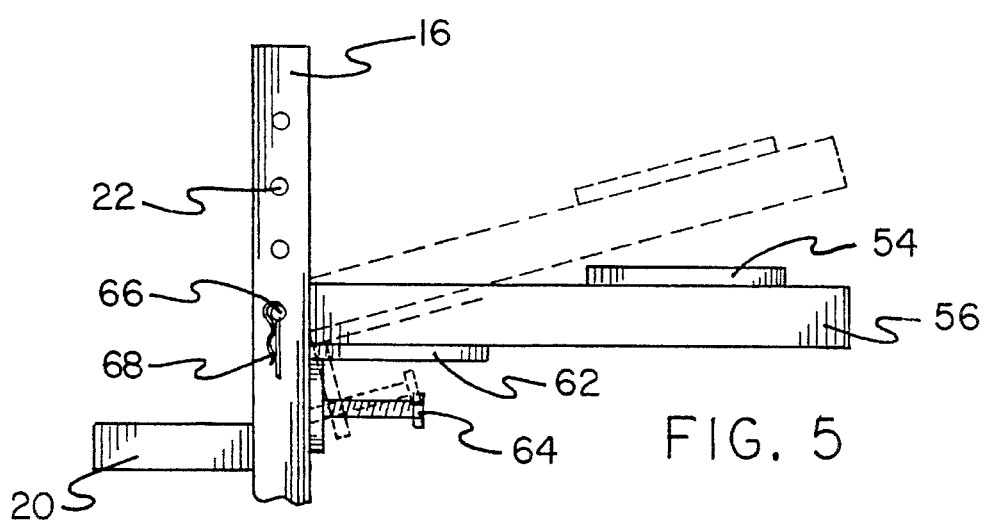
FIG. 5 is a side view of the present invention illustrating the adjustable upper support.
Figure 6:
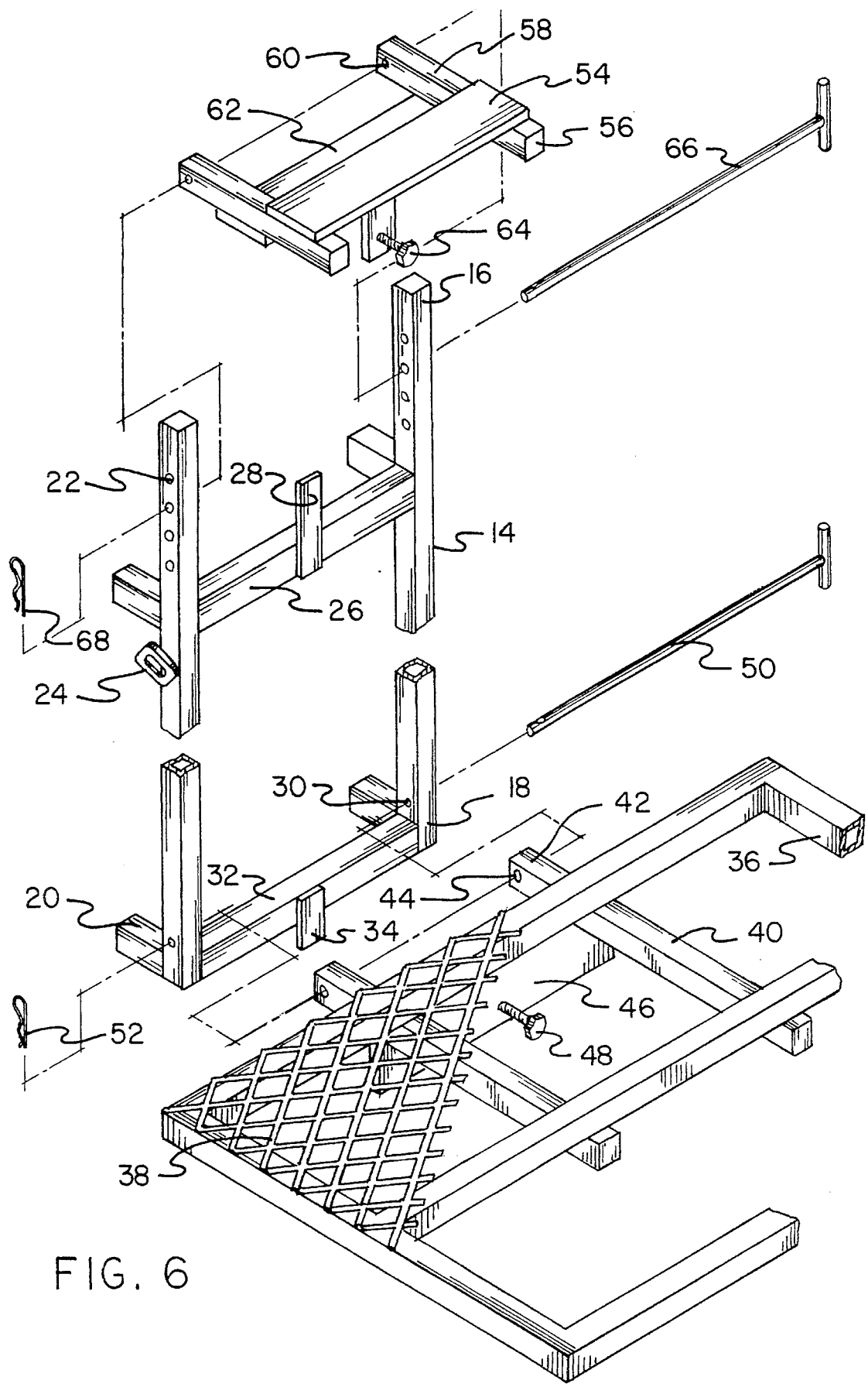
FIG. 6 is an exploded perspective view of the present invention.

With reference now to the drawings, and in particular, to FIG. 1 thereof, the preferred embodiment of the new and improved fully-adjustable tree stand embodying the principles and concepts of the present invention and generally designated by the reference number 10 will be described.

Specifically, it will be noted in the various Figures that the device relates to a new and improved fully-adjustable tree stand for adjustably attaching to the trunk of a tree to support a hunter. In its broadest context, the device consists of a rectangular bracket, a large lower platform, a small upper platform, and a chain.

The device 10 contains a rectangular bracket 12 having two vertically extending support bars 14. Each of the two support bars 14 has a first end 16 and a second end 18. Four horizontally extending legs 20 are secured to a back portion of the rectangular bracket 12 downward of each first end 16 and to a back portion of each second end 18. Each first end 16 has a plurality of apertures 22 formed through a side portion thereof. The plurality of apertures 22 of each first end 16 align with the other. A metal securement clasp 24 is secured to the side portion of each of the two support bars 14 downward of the plurality of apertures 22 thereof. An upper horizontal support bar 26 is secured to the two vertically extending support bars 14 downward of the plurality of apertures 22. An upwardly vertical extension 28 is secured to a midpoint of the upper horizontal support bar 26. Each second end 18 has an aperture 30 formed through a side portion thereof. A lower horizontal support bar 32 is secured to each second end 18 of the two vertically extending support bars 14 downward of the aperture 30. The lower horizontal support bar 32 has a downwardly vertical extension 34 secured to a midpoint thereof.

The device 10 contains a large lower platform 36 having an upper surface and a lower surface. The upper surface has mesh surface 38 theresecured. A support bracket 40 is secured to the lower surface. The support bracket 40 has two end portions 42 extending outwardly therefrom. The two end portions 42 have an aperture 44 formed therethrough. The support bracket 40 has a lower plate 46 secured to a lower surface thereof. The lower plate 46 has an adjustment means 48 theresecured. The aperture 44 formed through the two end portions 42 correspond with the aperture 30 formed in each second end 18 of the rectangular bracket 12. A metal rod 50 with locking pin 52 couples the large lower platform 36 to the rectangular bracket 12 through the corresponding apertures 30,44 thereof. The adjustment means 48 corresponds with the downwardly vertical extension 34. The adjustment means 48 serves to compensate for the angle at which trees lean.

The device 10 contains a small upper platform 54 having an upper surface and a lower surface. A support bracket 56 is secured to the lower portion. The support bracket 56 has two end portions 58 extending outwardly therefrom. The end portions 58 have an aperture 60 formed therethrough. The support bracket 56 has a lower plate 62 secured to a lower surface thereof. The lower plate 62 has an adjustment means 64 theresecured. The aperture 60 formed through the two end portions 58 corresponds with two of the aligning plurality of apertures 22 formed in each first end 16 of the rectangular bracket 12. A metal rod 66 with locking pin 68 adjustably couples the small upper platform 54 to the rectangular bracket 12 through the corresponding apertures thereof 22,60. The adjustment means 64 corresponds with the upwardly vertical extension 28.

The device contains a chain 66 having two end portions 68. The chain 66 serves to wrap around the tree with the two end portions 68 secured to the metal securement clasps 24 secured to the side portion of each of the two support bars 14 of the rectangular bracket 12.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved fully-adjustable tree stand for adjustably attaching to the trunk of a tree to support a hunter comprising, in combination:

a rectangular bracket having two vertically extending support bars, each of the two support bars having a first end and a second end, four horizontally extending legs secured to a back portion of the rectangular bracket downward of the each first end and to a back portion of each second end, each first end having a plurality of apertures formed through a side portion thereof, the plurality of apertures of each first end aligning with the other, a metal securement clasp secured to the side portion of each of the two support bars downward of the plurality of apertures thereof, an upper horizontal support bar secured to the two vertically extending support bars downward of the plurality of apertures, an upwardly vertical extension secured to a midpoint of the upper horizontal support bar, each second end having an aperture formed through a side portion thereof, a lower horizontal support bar secured to each second end of the two vertically extending support bars downward of the aperture, the lower horizontal support bar having a downwardly vertical extension secured to a midpoint thereof;

a large lower platform having an upper surface and a lower surface, the upper surface having mesh surface theresecured, a support bracket secured to the lower surface, the support bracket having two end portions extending outwardly therefrom, the two end portions having an aperture formed therethrough, the support bracket having a lower plate secured to a lower surface thereof, the lower plate having an adjustment means theresecured, the aperture formed through the two end portions corresponding with the aperture formed in each second end of the rectangular bracket, a metal rod with locking pin coupling the large lower platform to the rectangular bracket through the corresponding apertures thereof, the adjustment means corresponding with the downwardly vertical extension, the adjustment means serving to compensate for the angle at which trees lean;

a small upper platform having an upper surface and a lower surface, a support bracket secured to the lower portion, the support bracket having two end portions extending outwardly therefrom, the end portions having an aperture formed therethrough, the support bracket having a lower plate secured to a lower surface thereof, the lower plate having an adjustment means theresecured, the aperture formed through the two end portions corresponding with two of the aligning plurality of apertures formed in each first end of the rectangular bracket, a metal rod with locking pin adjustably coupling the small upper platform to the rectangular bracket through the corresponding apertures thereof, the adjustment means corresponding with the upwardly vertical extension;

a chain having two end portions, the chain serving to wrap around the tree with the two end portions secured to the metal securement clasps secured to the side portion of each of the two support bars of the rectangular bracket.

* * * * *